(12) United States Patent
Langenfeld

(10) Patent No.: US 9,163,724 B1
(45) Date of Patent: Oct. 20, 2015

(54) TRANSAXLE HAVING DUAL BRAKE SYSTEM

(71) Applicant: Hydro-Gear Limited Partnership, Sullivan, IL (US)

(72) Inventor: Thomas J. Langenfeld, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 542 days.

(21) Appl. No.: 13/659,350

(22) Filed: Oct. 24, 2012

Related U.S. Application Data

(60) Provisional application No. 61/550,701, filed on Oct. 24, 2011.

(51) Int. Cl.
*F16D 39/00* (2006.01)
*F16D 33/02* (2006.01)
*F16H 63/30* (2006.01)
*F16H 61/4157* (2010.01)

(52) U.S. Cl.
CPC ........ *F16H 63/3026* (2013.01); *F16H 61/4157* (2013.01)

(58) Field of Classification Search
CPC ................. F16H 61/4157; F16H 63/3026
USPC .......................................................... 60/489
See application file for complete search history.

(56) References Cited

U.S. PATENT DOCUMENTS

| | | |
|---|---|---|
| 362,491 A | 5/1887 | Carpenter |
| 3,819,016 A | 6/1974 | Radcliffe et al. |
| 3,838,710 A | 10/1974 | Reip |
| 4,280,595 A | 7/1981 | Timms et al. |
| 4,342,256 A | 8/1982 | Andersen et al. |
| 4,785,714 A | 11/1988 | Tamada et al. |
| 4,845,949 A | 7/1989 | Shivvers et al. |
| 5,113,977 A | 5/1992 | Ridings et al. |
| 5,386,742 A | 2/1995 | Irikura et al. |
| 5,421,434 A | 6/1995 | Liao |
| 5,794,443 A | 8/1998 | Shimizu |
| 6,170,615 B1 | 1/2001 | Cheung |
| 6,179,092 B1 | 1/2001 | Naakgeboren et al. |
| 6,220,288 B1 | 4/2001 | Sandau et al. |
| 6,220,289 B1 | 4/2001 | Zenker et al. |
| 6,247,494 B1 | 6/2001 | Deininger |
| 6,427,721 B1 | 8/2002 | Zenker et al. |
| 6,499,505 B2 | 12/2002 | Zenker et al. |
| 6,701,825 B1 | 3/2004 | Langenfeld |
| 6,722,477 B1 | 4/2004 | Wolfsteiner et al. |
| 6,986,363 B1 | 1/2006 | Trimble et al. |
| 7,134,276 B1 * | 11/2006 | Langenfeld et al. ............ 60/442 |
| 7,225,617 B1 * | 6/2007 | Langenfeld et al. ............ 60/464 |
| 7,328,576 B1 * | 2/2008 | Langenfeld et al. ............ 60/487 |

OTHER PUBLICATIONS

Seatrax, "Fail-Safe Hoist Features", STDFM-156 Rev. 1 Jul. 16, 2010, pp. 1-4, Houston, Texas.
U.S. Appl. No. 13/680,543 filed Nov. 19, 2012, Thomas J. Langenfeld Applicant.

* cited by examiner

*Primary Examiner* — Edward Look
*Assistant Examiner* — Daniel Collins
(74) *Attorney, Agent, or Firm* — Neal, Gerber & Eisenberg LLP

(57) ABSTRACT

A hydraulic drive unit for use in a vehicle or other application incorporates a motor connected to a pump through a porting system and an output shaft driven by the motor. A mechanical brake is used to brake the motor, while a valve provides a hydraulic brake for preventing flow between the hydraulic motor and the hydraulic pump. A brake actuator is connected to both the mechanical brake and the hydraulic brake, whereby actuation of the brake actuator causes both the mechanical brake and the hydraulic brake to be actuated.

20 Claims, 15 Drawing Sheets

TRANSAXLE HAVING DUAL BRAKE SYSTEM

CROSS-REFERENCE TO RELATED APPLICATION

This application claims the benefit of Provisional Application Ser. No. 61/550,701, filed Oct. 24, 2011, which is incorporated herein by reference in its entirety.

BACKGROUND OF THE INVENTION

This invention relates to a hydraulic drive unit such as a hydrostatic transaxle that is capable of hydraulic braking and can be used in drive systems, e.g. for vehicles. This invention further relates to a hydrostatic transaxle having a mechanical brake that is used in conjunction with a hydraulic brake.

SUMMARY OF THE INVENTION

The drive apparatus disclosed herein includes a hydraulic pump driving a hydraulic motor by fluid flow through hydraulic porting integrally formed in a housing. A valve in the hydraulic porting can be closed by manipulation of a control linkage to block fluid flow to and from the hydraulic motor. Blocking such fluid flow causes dynamic, hydraulic braking of the hydraulic motor and an axle connected to the hydraulic motor. The following disclosure further provides a mechanical brake that is simultaneously actuated by the control linkage that actuates the hydraulic brake. The mechanical brake engages after hydraulic braking has slowed rotation of the axle sufficiently to allow engagement of a toothed engagement member with a toothed hub fixed to the axle. The mechanical brake is particularly useful as a parking brake for a vehicle. Other applications of the hydraulic drive unit disclosed herein will be known to those of ordinary skill in the art.

A better understanding of the objects, advantages, features, properties and relationships of the invention will be obtained from the following detailed description and accompanying drawings which set forth an illustrative embodiment and is indicative of the various ways in which the principles of the invention may be employed.

DETAILED DESCRIPTION OF THE INVENTION

Figure 1:
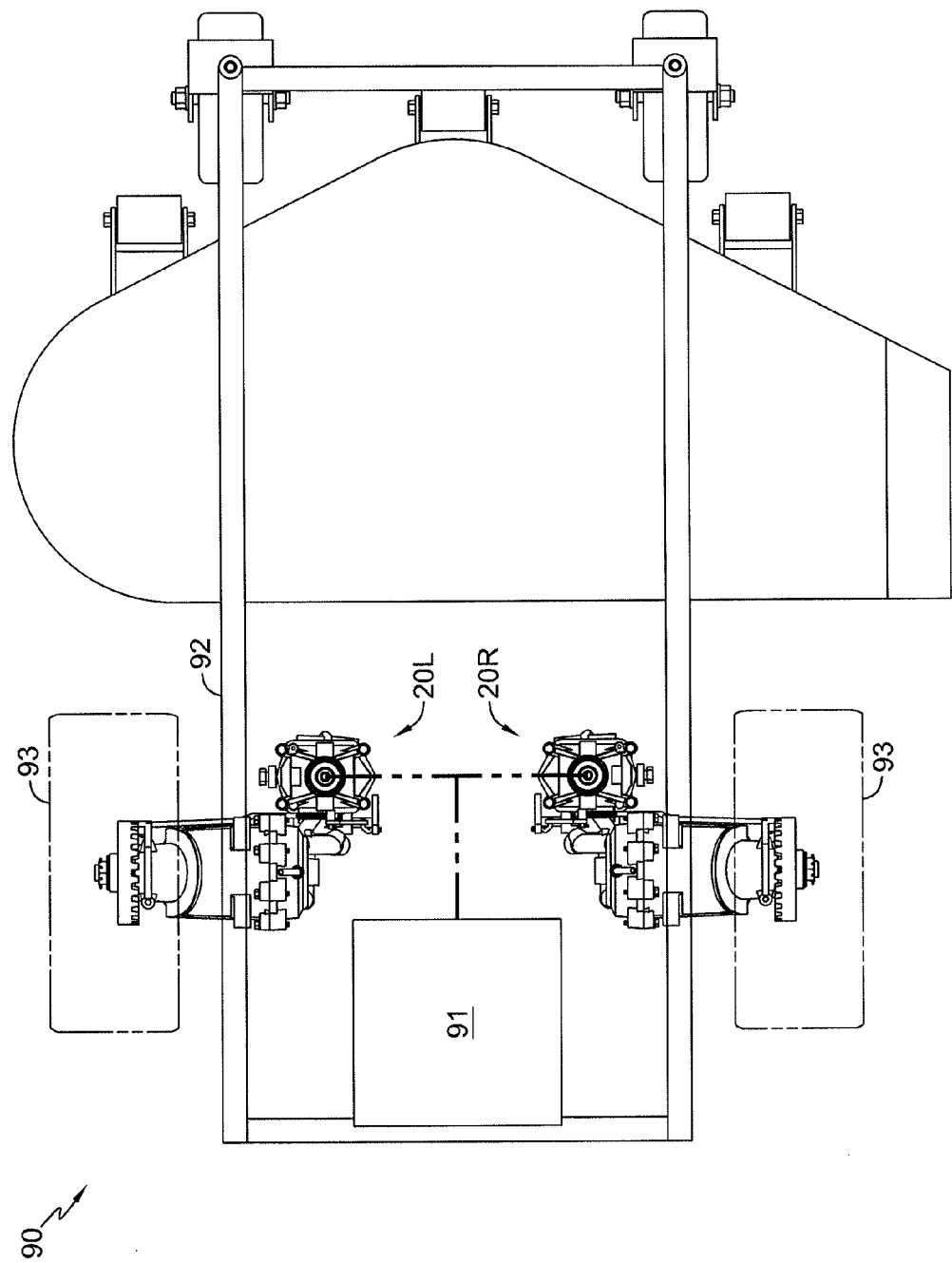
FIG. 1 is a top plan view of a zero-turn vehicle incorporating two transaxles of the invention.
Figure 2:
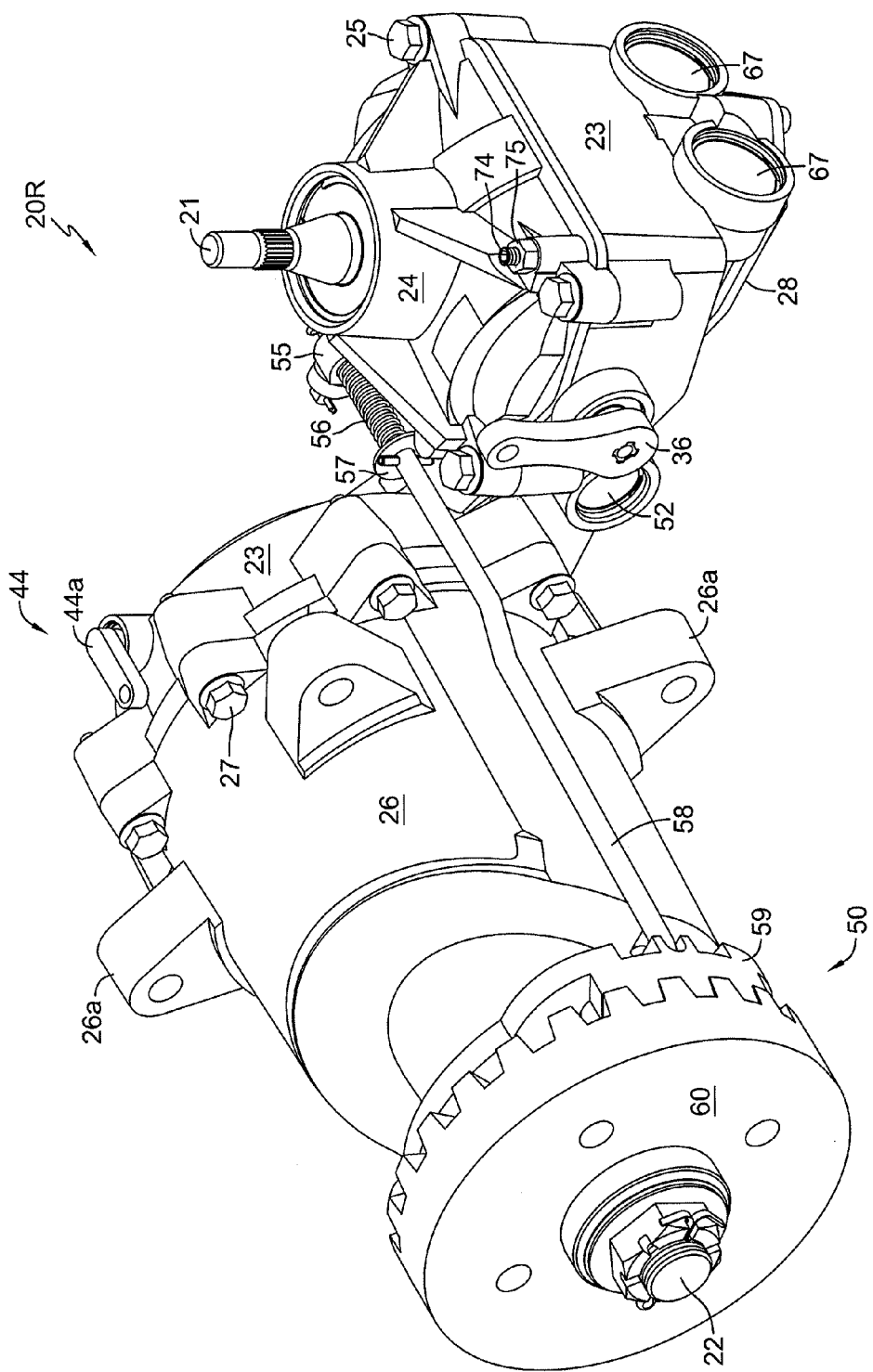
FIG. 2 is a perspective view of one of the transaxles shown in FIG. 1.
Figure 3:
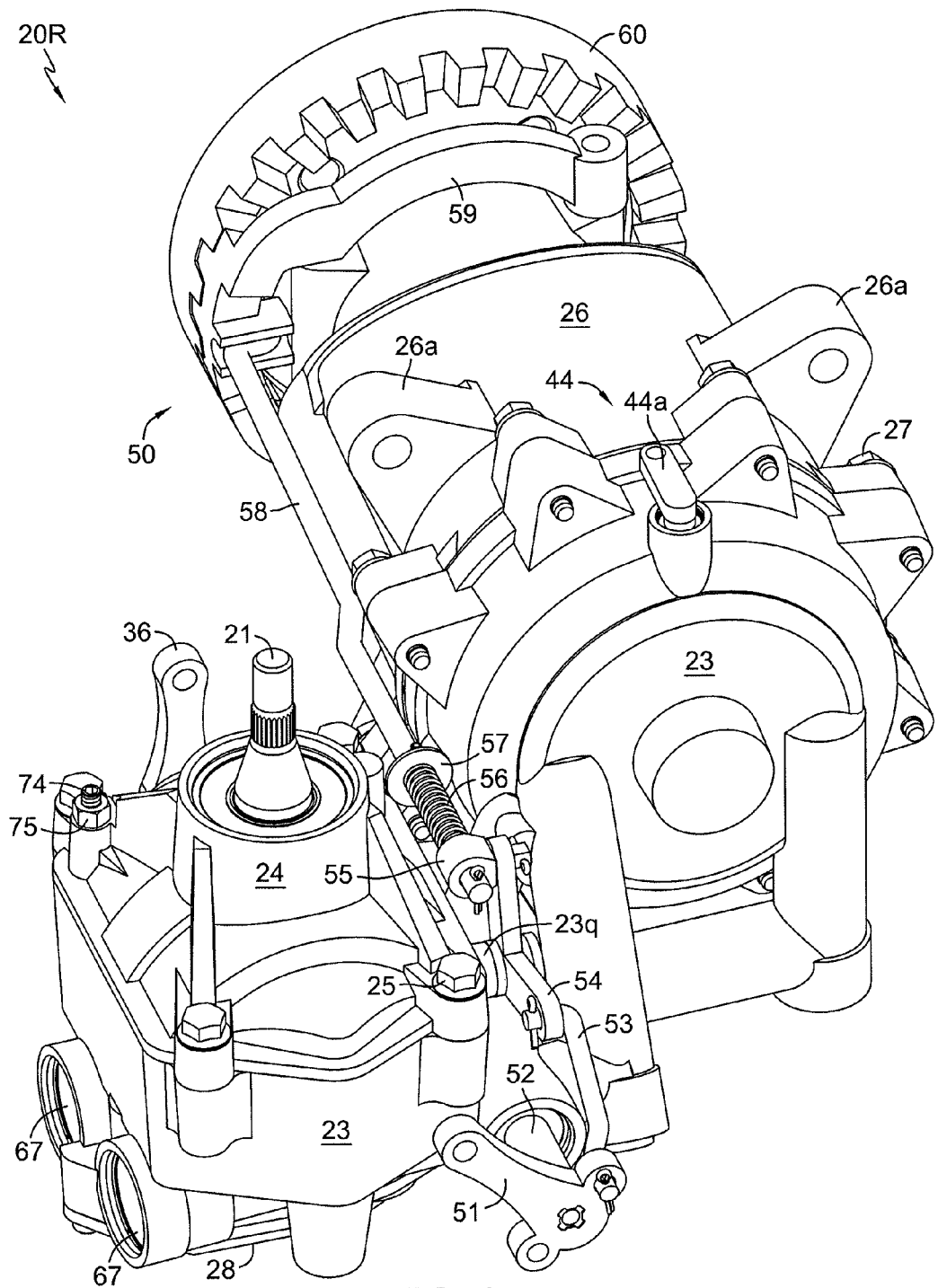
FIG. 3 is a further perspective view of the transaxle of FIG. 2.

The transaxle depicted herein is preferably used in tandem in connection with a zero turn vehicle. FIG. 1 depicts vehicle 90 having transaxle assemblies 20L and 20R. FIGS. 2 and 3 depict the external view of one of these transaxles 20R, with the understanding that transaxle 20L is essentially identical in construction and is therefore depicted as a mirror image of transaxle 20R. Transaxles 20L, 20R are mounted to frame 92 by fasteners (not shown) extending through mounting lugs 26a formed on motor housing 26. Prime mover 91 provides power through a power transfer means such as a belt and pulley assembly (not shown) to transaxles 20L and 20R, each of which independently drives a wheel 93 mounted on a hub 60. Pump input shaft 21 is splined to accept a pulley (not shown) that is driven by a belt (not shown) running between pump input shaft 21 and prime mover 91 in a known manner. It will be understood that the features of the transaxle described herein can also be applied to a single transaxle unit having one or two axles for use in other powered machinery or non-zero-turn vehicle applications.

As shown in FIGS. 5-9, main housing 23 of transaxle 20R includes three integrated structures or sections related to function, i.e., a motor section 87, a pump section 88, and a conduit section 89. Motor section 87 is connected to the pump section 88 by the conduit section 89. Motor section 87 is not connected to the pump section 88 other than through conduit section 89.

Referring to FIGS. 2-9, pump cover 24 is secured to pump section 88 of main housing 23 by a plurality of fasteners 25 to form sump 48 and enclose an axial piston pump 30 that is disposed on pump running surface 23a of pump section 88. Motor housing 26 is secured to motor section 87 of main housing 23 by a plurality of fasteners 27 to form sump 49 and enclose an axial piston motor 40 that is disposed on motor running surface 23b of motor section 87. Pump 30 and motor 40 are shown in isolation and relatively positioned in FIG. 4.

Figure 10:
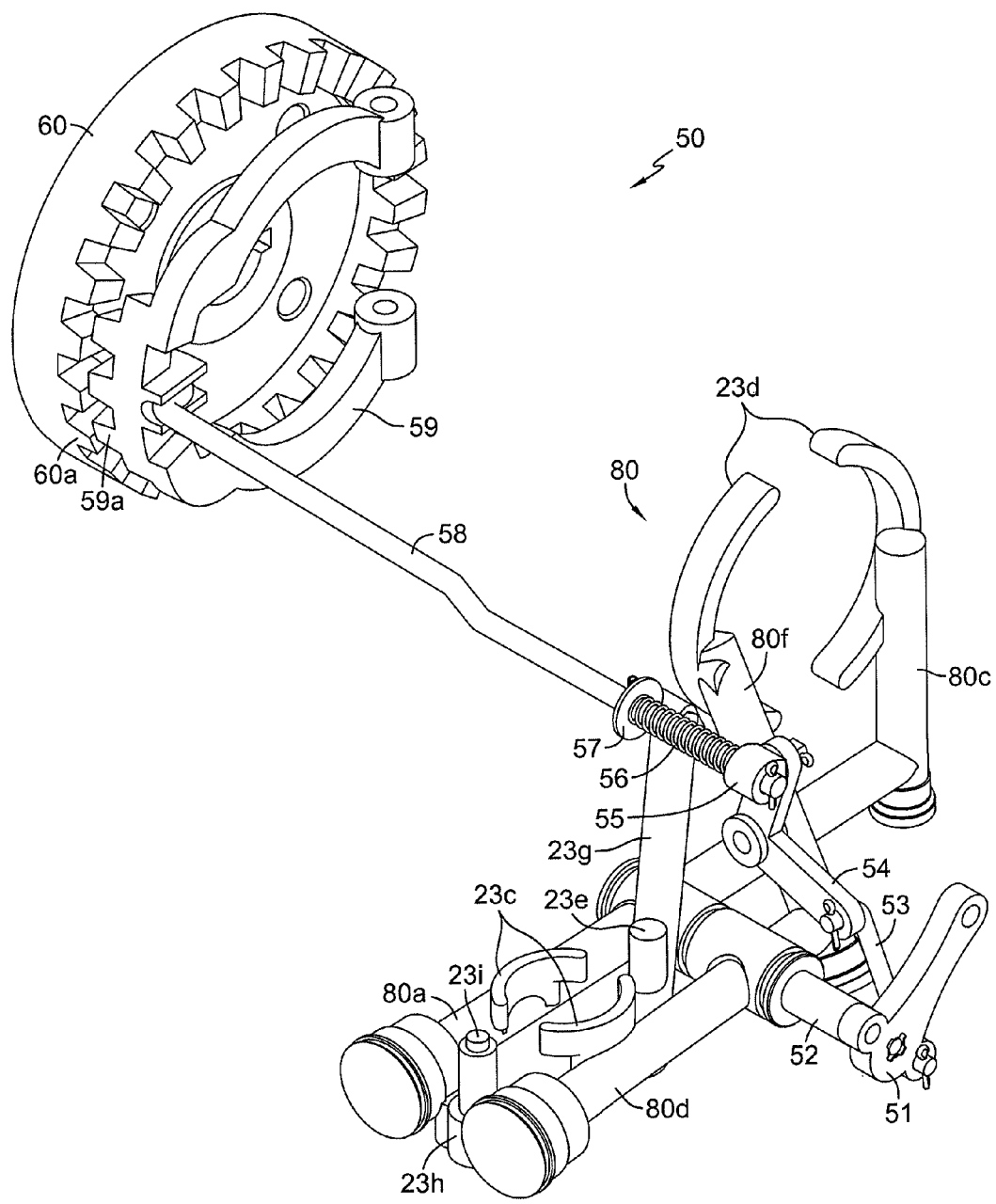
FIG. 10 is a perspective view of the hydraulic and mechanical dual braking system of the transaxle shown in FIGS. 2 and 3, with both brake mechanisms disengaged.
Figure 11:
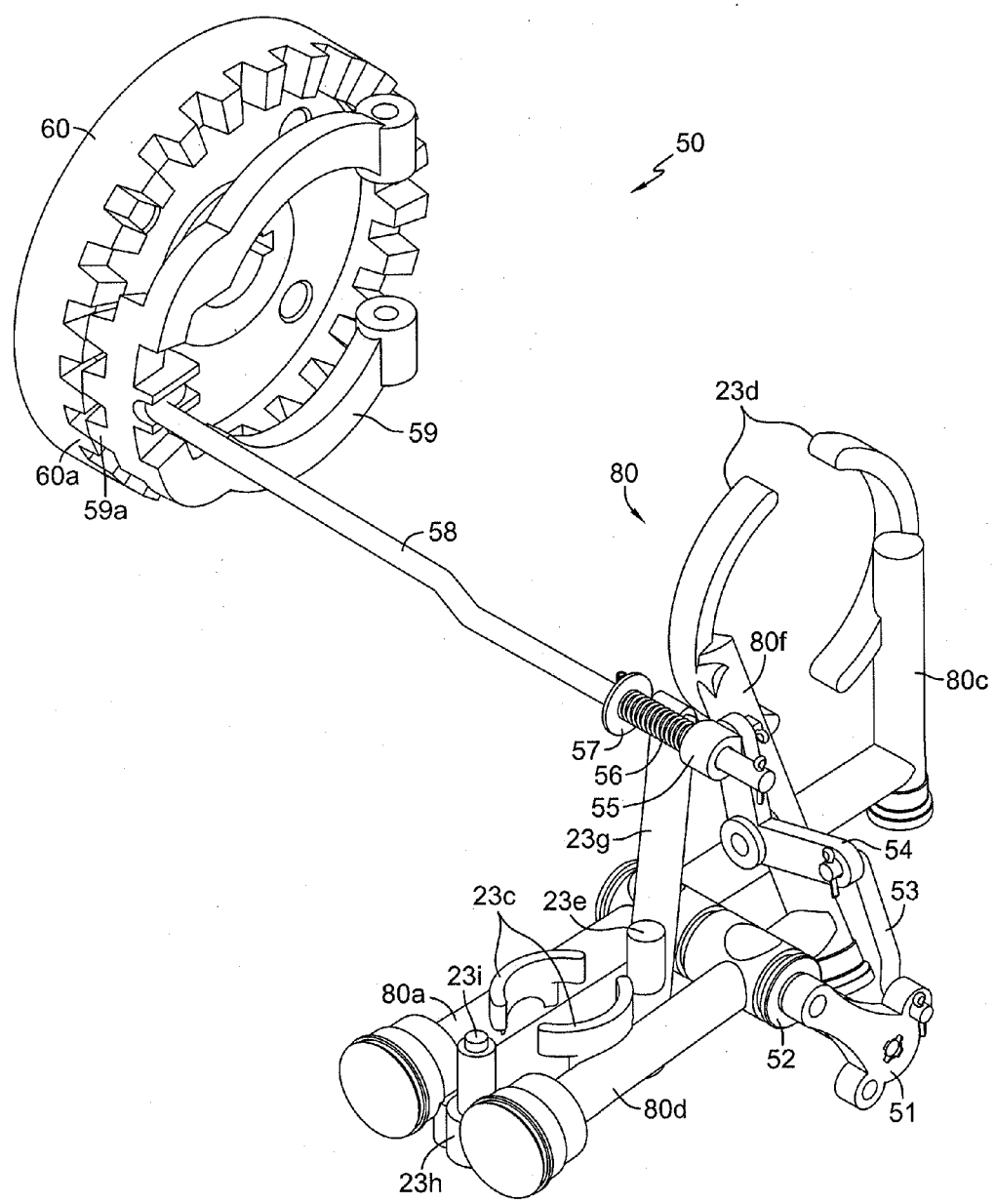
FIG. 11 is a view similar to that of FIG. 10, with the hydraulic brake engaged and the mechanical brake disengaged.
Figure 12:
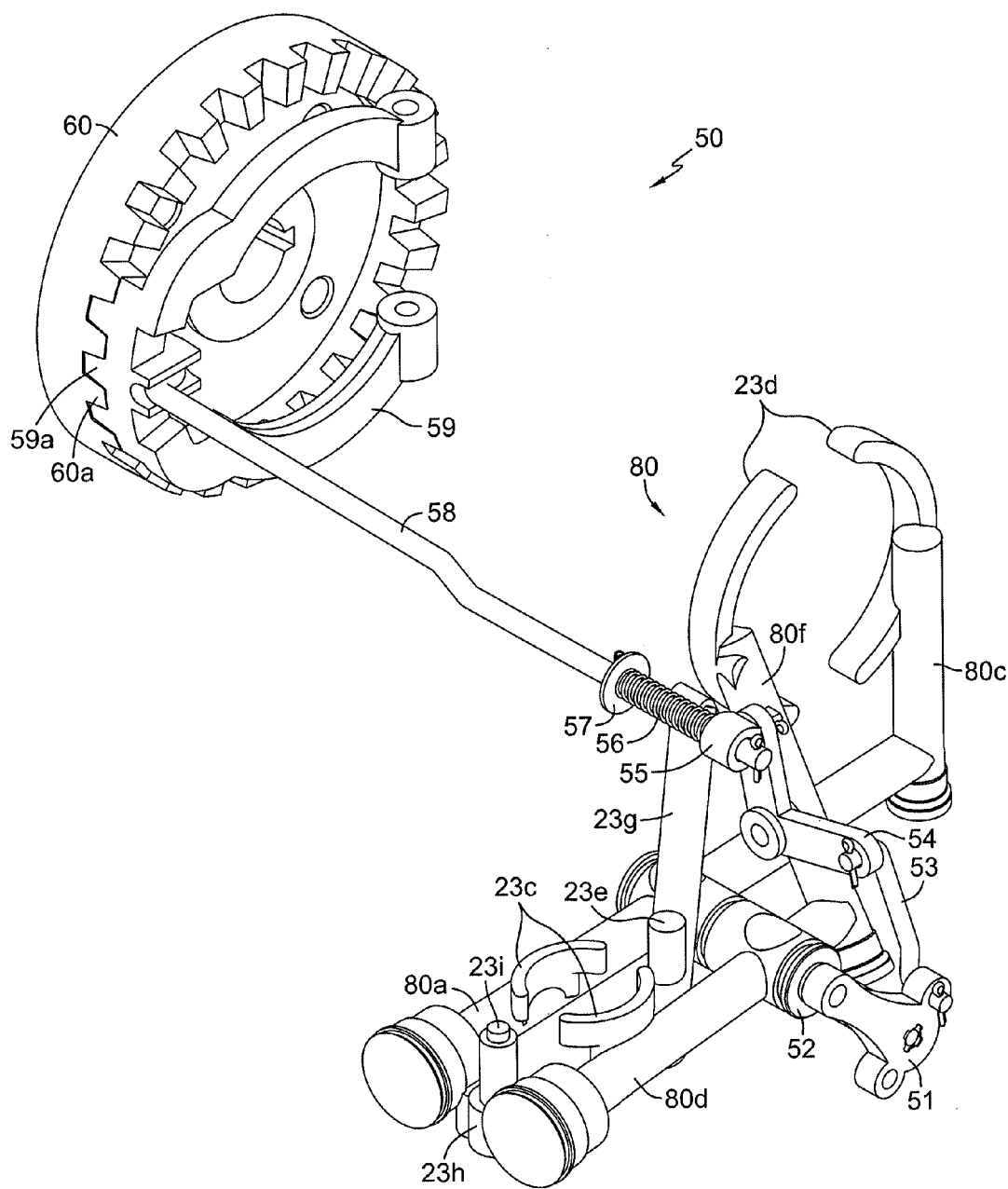
FIG. 12 is a view similar to that of FIGS. 10 and 11, with both brake mechanisms engaged.
Figure 13:
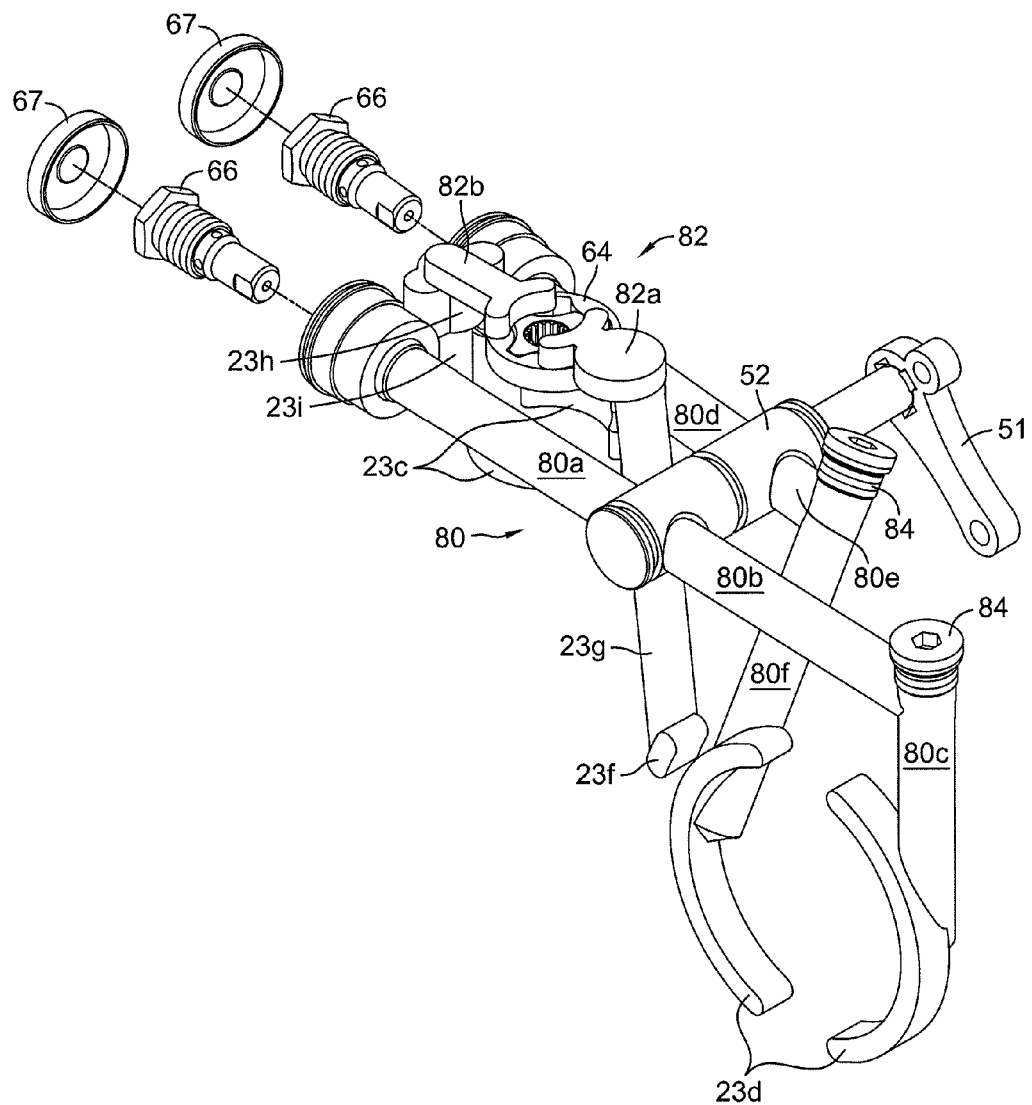
FIG. 13 is a perspective view of the hydraulic fluid passages, spool valve and shock valves of the transaxle shown in FIGS. 2 and 3.

In order to more clearly disclose the relationship of the various hydraulic passages formed in main housing 23 to the mechanical structures of the transaxle, FIGS. 10-13 depict the various elements of the hydraulic passages, such as kidney ports 23c, 23d and fluid passages 80a, 80c, 80d and 80f, among others, in a representational manner. For example, FIG. 13 is a representational view showing main housing fluid passages 80 that are formed within conduit section 89 and extend into pump section 88 and motor section 87 to complete a hydraulic circuit between axial piston pump 30 and axial piston motor 40. Similarly, FIGS. 10-12 show the relationship between hydraulic porting elements, spool valve 52, and mechanical elements of brake mechanism 50. These representational figures are intended to depict the essential structure of these hydraulic porting elements, and also to depict related mechanical structure. The manner in which such hydraulic ports and passages are cast or otherwise formed in a housing member is known to one of ordinary skill in the art.

Figure 8:
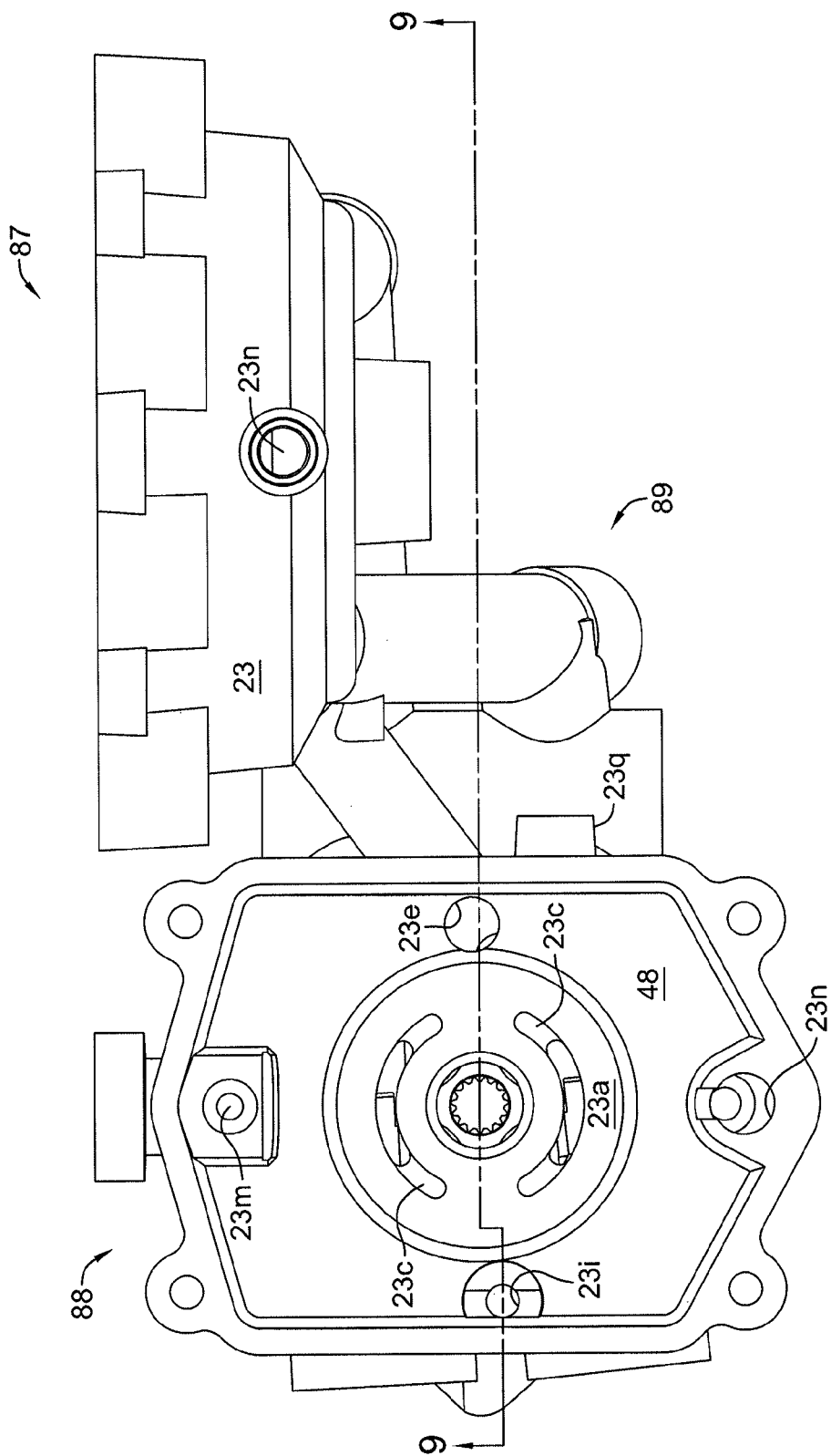
FIG. 8 is a top plan view of the main housing shown in FIG. 5.
Figure 9:
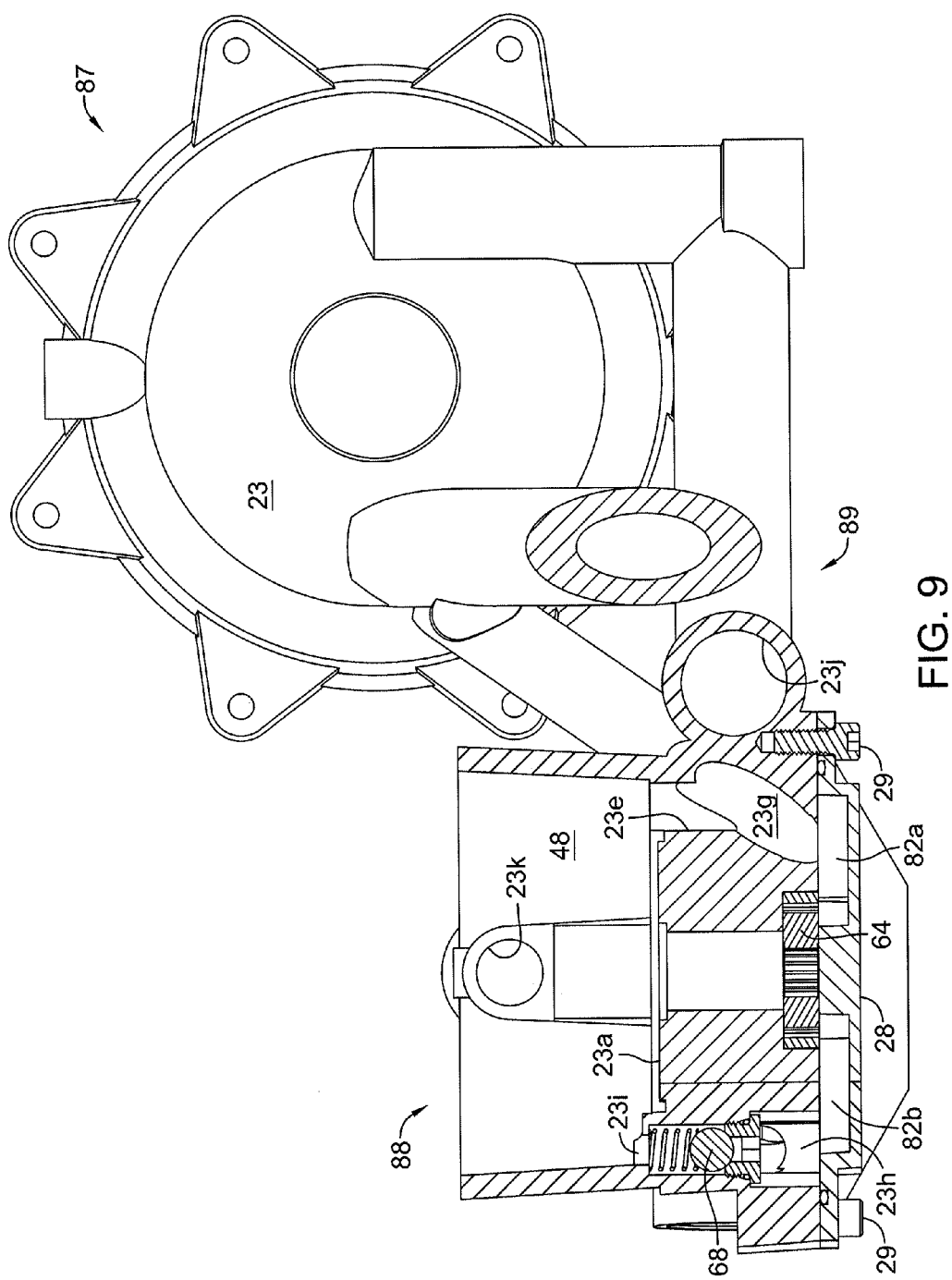
FIG. 9 is a cross-sectional view of the main housing of the transaxle, taken along line 9-9 of FIG. 8.

Referring to FIG. 8, pump running surface 23a of pump section 88 includes kidney ports 23c that allow flow of hydraulic fluid from and to axial piston pump 30 through conduit section 89 which provides for passage of hydraulic fluid to and from motor section 87. Similarly, referring to FIGS. 6 and 7, motor running surface 23b of motor section 87 includes motor kidney ports 23d that allow flow of hydraulic fluid to and from axial piston motor 40 through conduit section 89. As shown in FIG. 13, plugs 84 seal openings in conduit section 89 that remain after machining of main housing 23 to create fluid passages 80c and 80f.

Spool valve bore 23j is formed in main housing 23 so that spool valve 52 is rotatably disposed in conduit section 89. External brake arm 51 is fixed to the end of spool valve 52 to rotate spool valve 52 in spool valve bore 23j between a first position which permits flow of hydraulic fluid through spool valve 52 and fluid passages 80a-80f, and a second position which prevents such flow to hydraulically brake axial piston motor 40. Rotation of brake arm 51 to its second position hydraulically brakes motor cylinder block 41. As shown, e.g., in FIGS. 2 and 4, axle 22 is fixed to motor cylinder block 41 and hub 60 is mounted on one end of axle 22. Therefore, hub 60 is braked hydraulically by axial piston motor 40 when spool valve 52 is rotated to its second position via rotation of brake arm 51 to its second position. While this embodiment illustrates axle 22 intended for driving a vehicle, as noted above this invention is not so limited and this term can encompass an output shaft for driving a different application.

In addition to this hydraulic braking function, transaxle 20R includes the aforementioned mechanical brake mechanism 50 that is also controlled by rotating brake arm 51. Thus, brake arm 51 constitutes both a hydraulic brake actuator and a mechanical brake actuator. Rotation of brake arm 51 moves linkage elements of brake mechanism 50 to cause toothed engagement member 59 to engage toothed hub 60 as will be further described. As can be seen in FIGS. 3 and 10, rod 53 has one end secured to brake arm 51 and the opposite end secured to one end of pivot arm 54. Pivot arm 54 is pivotally fastened to pivot boss 23q formed in main housing 23 and shown in FIG. 8. The opposite end of pivot arm 54 is secured to sleeve 55. Sleeve 55 is movably disposed about one end of rod 58. Spring 56 is disposed about rod 58 between sleeve 55 and stop 57. When brake arm 51 is rotated, pivot arm 54 pivots and causes sleeve 55 to push spring 56 against stop 57. The pressure of spring 56 against stop 57 in turn causes axial movement of rod 58. The end of rod 58 opposite sleeve 55 bears against one side of toothed engagement member 59. Toothed engagement member 59 includes teeth 59a formed on its opposite side. Once hydraulic braking of axial piston motor 40 has sufficiently slowed the rotation of hub 60, the force of spring 56 causes teeth 59a to engage hub teeth 60a formed on hub 60 to prevent rotation of hub 60.

FIGS. 10-12 illustrate the braking progression described above. FIG. 10 shows brake arm 51 in its first position in which no braking of the transaxle is occurring because spool valve 52 is permitting fluid communication between axial piston pump 30 and axial piston motor 40 and brake mechanism 50 is disengaged. FIG. 11 shows the same system of FIG. 10 immediately after brake arm 51 has been moved to its second position to close spool valve 52 and compress spring 56. FIG. 12 shows the same system again after hydraulic braking has slowed hub 60 sufficiently to allow teeth 59a to engage teeth 60a to prevent rotation of hub 60.

Figure 4:
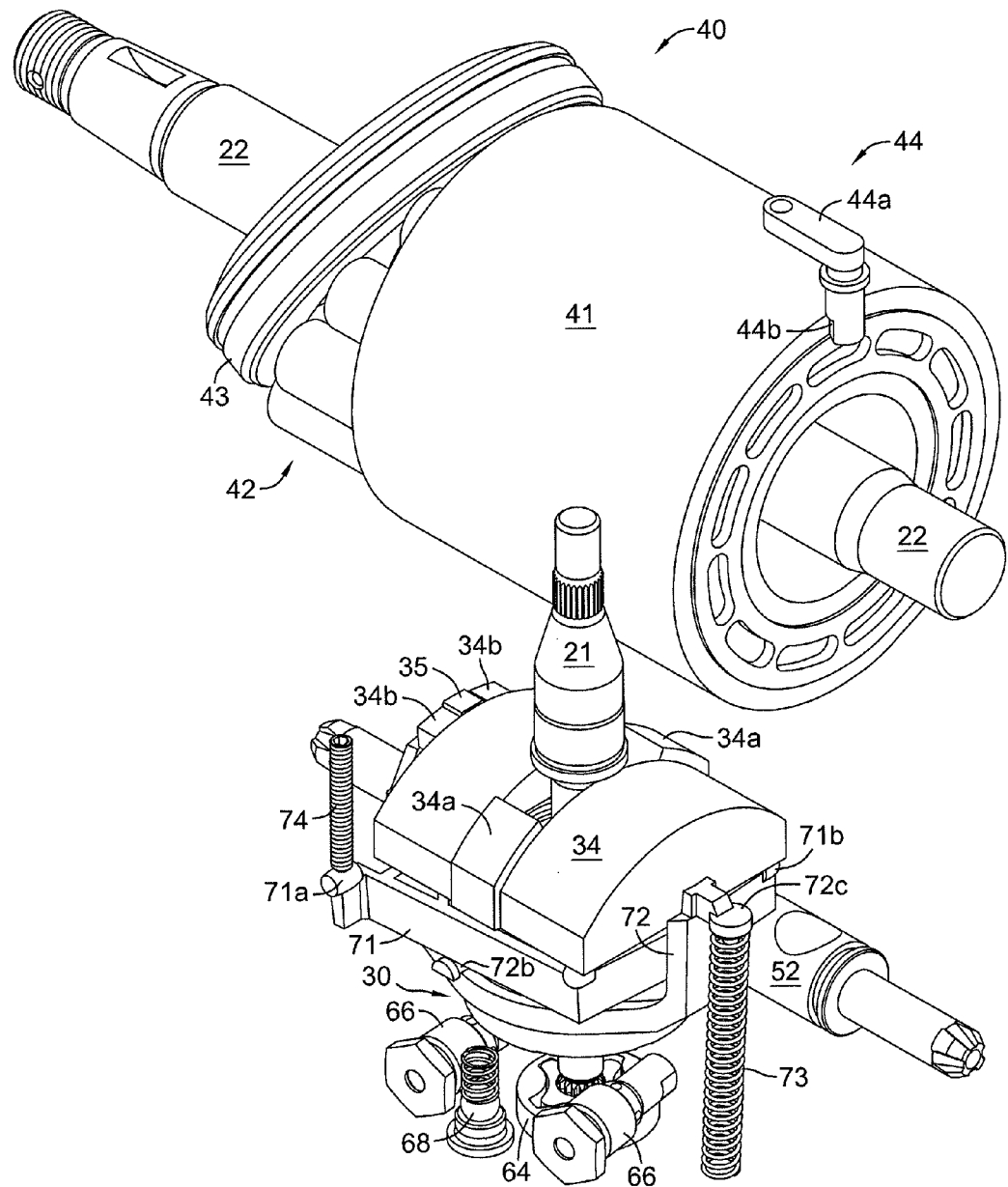
FIG. 4 is a perspective view of an axial piston motor and an axial piston pump with return-to-neutral mechanism used in the transaxle shown in FIGS. 2 and 3.
Figure 5:
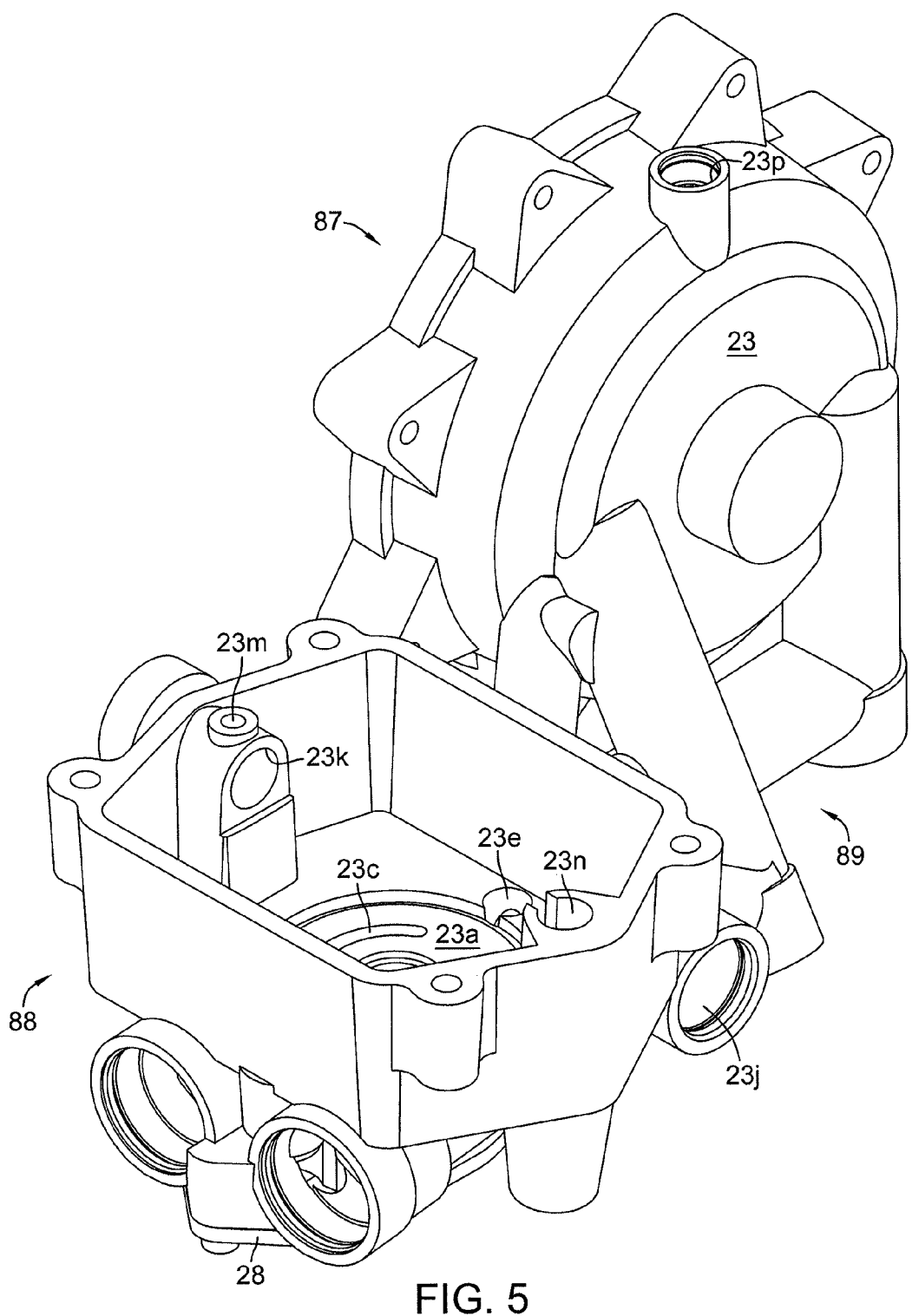
FIG. 5 is a perspective view of the main housing of the transaxle shown in FIGS. 2 and 3.
Figure 6:
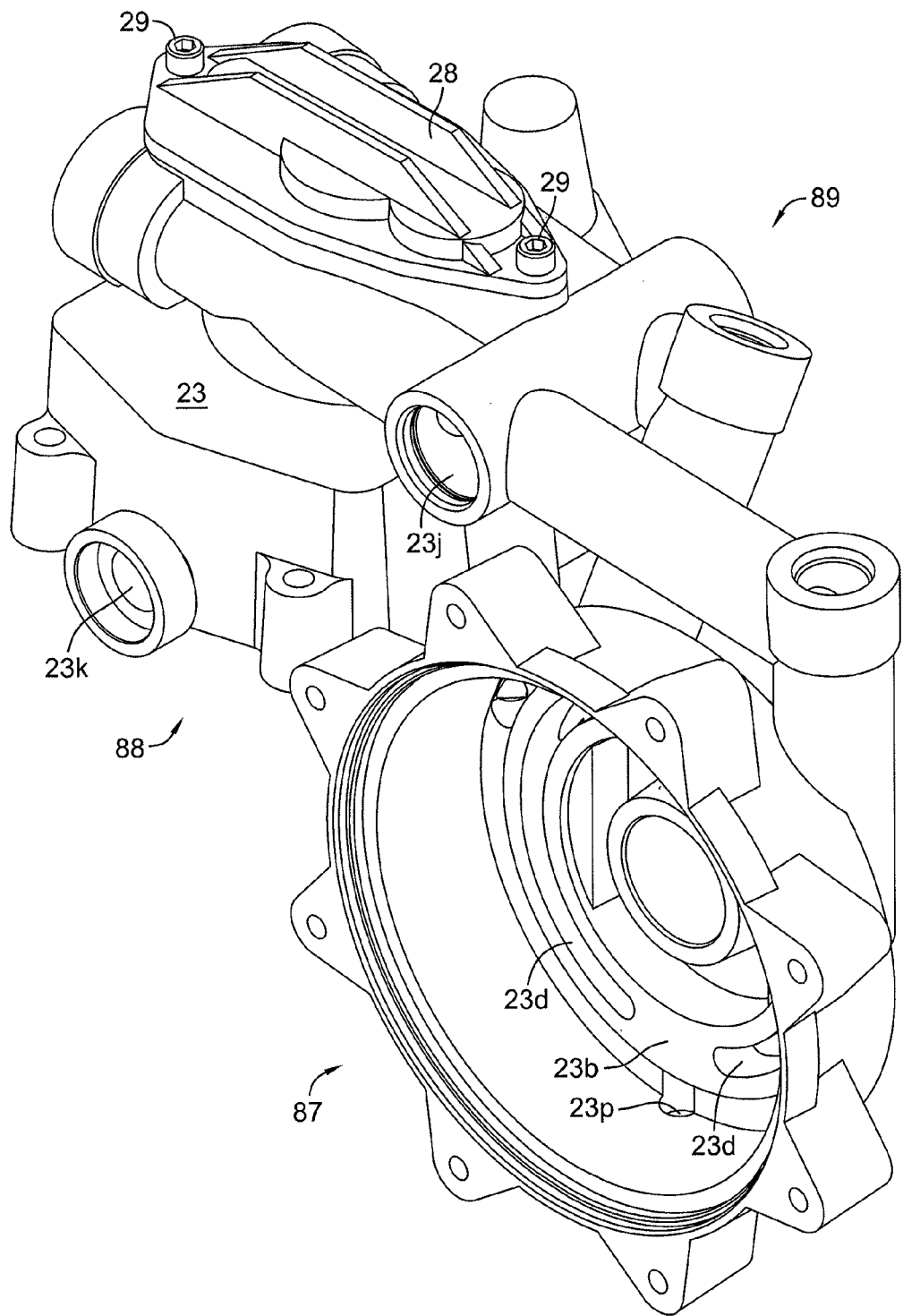
FIG. 6 is a bottom perspective view of the main housing shown in FIG. 5.
Figure 7:
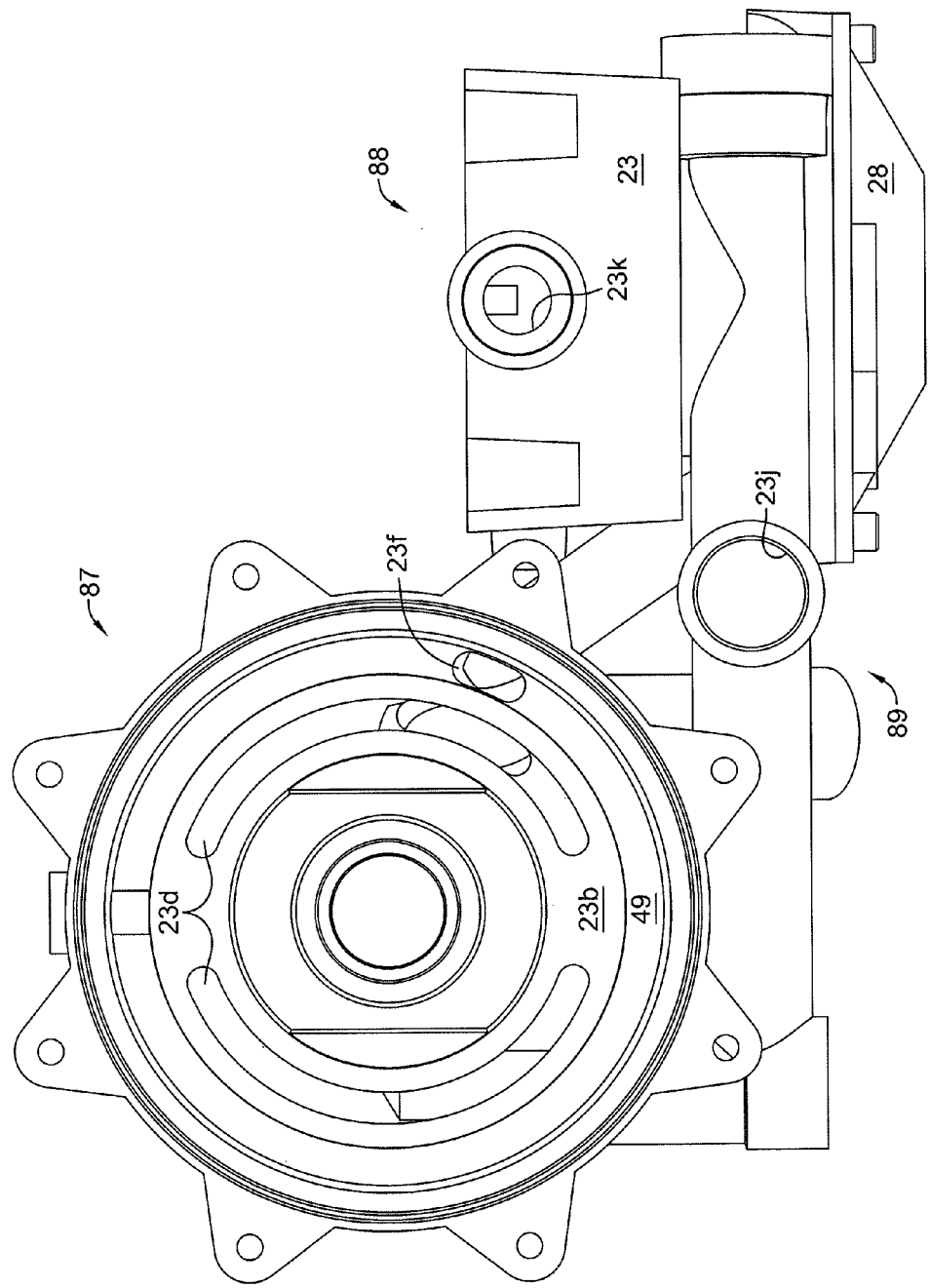
FIG. 7 is a side elevational view of the main housing shown in FIG. 5.
Figure 14:
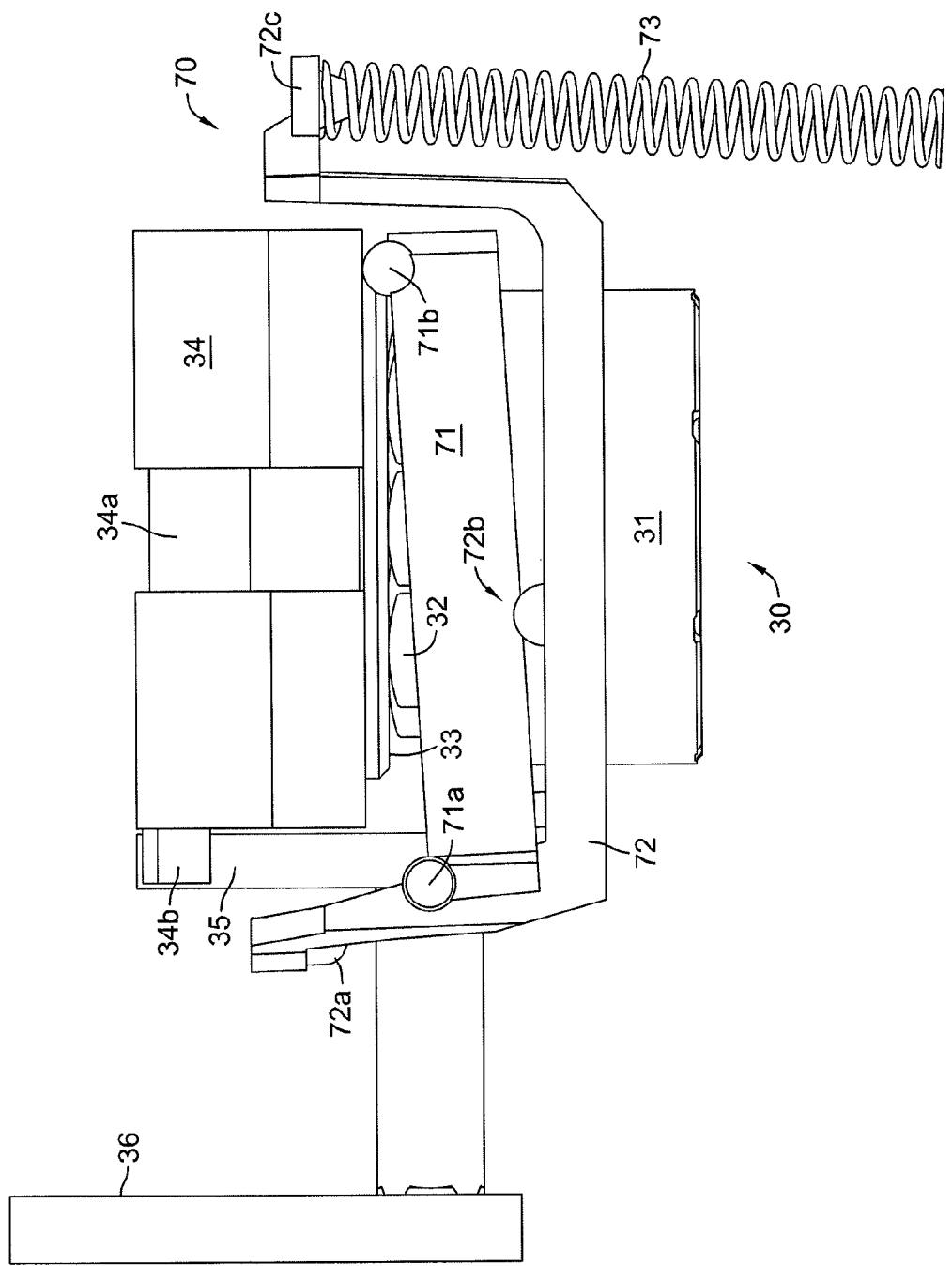
FIG. 14 is an elevational view of the axial piston pump with return-to-neutral mechanism used in the transaxle shown in FIG. 2.
Figure 15:
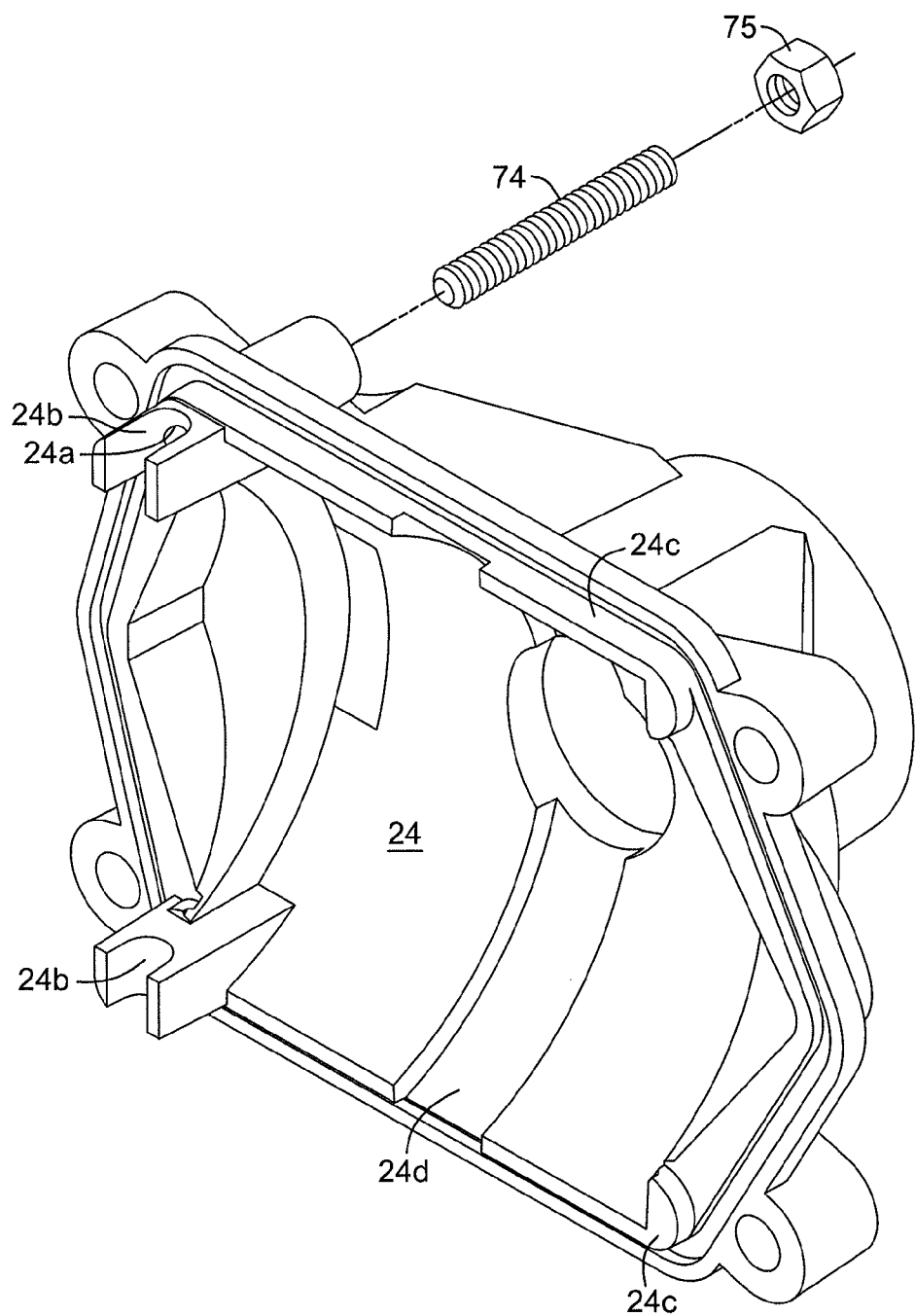
FIG. 15 is a perspective view of the pump cover of the transaxle shown in FIGS. 2 and 3.

Axial piston pump 30 includes pump cylinder block 31 that is splined to and driven by input shaft 21. Referring to FIGS. 4, 14 and 15, pump pistons 32 reciprocate in pump cylinder block 31 and have ends that bear against pump thrust bearing 33. Pump pistons 32 have opposite ends (not shown) that are open and that communicate with pump kidney ports 23c. Pump thrust bearing 33 bears against swash plate 34. Swash plate 34 has guide ribs 34a that are slidingly engaged to swash plate guide slot 24d in pump cover 24. Swash plate 34 also has a pair of protrusions 34b that slidingly engage one end of trunnion arm 35. The opposite end of trunnion arm 35 extends through trunnion arm bore 23k and is fixed to control arm 36. When control arm 36 is manipulated, force is applied by the one end of trunnion arm 35 against one of the pair of protrusions 34b, thereby tilting swash plate 34 to cause hydraulic fluid to flow from pump pistons 32 into one of pump kidney ports 23c. Return-to-neutral (RTN) mechanism 70 serves to return the pump to neutral when manipulation of control arm 36 ceases.

RTN mechanisms are described in U.S. Pat. No. 6,701,825, the disclosure of which is incorporated herein in its entirety by reference thereto. In the embodiment depicted herein, RTN mechanism 70 has return plate 71 with a pair of swash plate contacts 71b on one side thereof bearing against swash plate 34. The opposite side of return plate 71 has a pair of return plate pivots 71a, which are contained in return plate pivot grooves 24b of pump cover 24 that is shown in FIG. 15. One of the return plate pivot grooves 24b has a neutral set opening 24a into which a neutral set screw 74 can be turned to adjust the neutral setting of RTN mechanism 70. When the neutral position of swash plate 34 is properly set, neutral set screw 74 is secured by lock nut 75. Return plate 71 is supported on a pair of bearing protrusions 72b formed on opposite sides of U-shaped load plate 72. Load plate 72 is supported on one side by the engagement of load plate pivot 72a with load plate pivot recess 23m of main housing 23, shown in FIGS. 5 and 8. The opposite side of load plate 72 is supported by engagement of spring keeper 72c with return spring 73, the spring keeper 72c being disposed above the bearing protrusions 72b of load plate 72. Return spring 73 is located within return spring bore 23n of main housing 23. When manipulation of control arm 36 ceases, the return spring 73 forces load plate 72, return plate 71, and swash plate 34 to return to the neutral position and thus return the transaxle to its hydraulic neutral state.

Pump cover 24 has alignment features 24c as shown in FIG. 15 to ensure correct alignment with main housing 23. As shown most clearly in FIG. 9, pump drain passage 23e allows hydraulic fluid in pump sump 48 to drain into sump connecting passage 23g and from there into charge pump inlet 82a that is created when charge pump cover 28 is attached to main housing 23 via charge cover fasteners 29. Gerotor charge pump 64 draws hydraulic make-up fluid from charge pump inlet 82a and supplies it to charge pump outlet passage 82b. The hydraulic make-up fluid then flows into charge gallery 23h. If the pressure in either of fluid passages 80a or 80d is sufficiently low, the hydraulic make-up fluid will enter the one of such passages having the lower pressure. If the pressure in neither of such passages is low enough, the hydraulic make-up fluid will flow through charge relief valve 68 set in charge relief passage 23i and into pump sump 48.

As shown in FIG. 13, shock valves 66 are inserted in fluid passages 80a and 80d. Shock valves 66 are depicted as combination shock valves and check valves of the type described in U.S. Pat. No. 6,986,363, the disclosure of which is incorporated herein in its entirety by reference thereto. During normal operation of the transaxle, shock valves 66 act as check valves allowing hydraulic make-up fluid to flow into the low pressure side of the hydraulic circuit as discussed above. In the event of shock to the hydraulic circuit in which pressure in one or both of the fluid passages 80*a* or 80*d* exceeds a predetermined maximum pressure, shock valves 66 will allow hydraulic fluid to flow from one or both of such fluid passages into charge gallery 23*h* and thereby relieve such pressure through charge relief valve 68. Plug seals 67 seal the openings in fluid passages 80*a* and 80*d* into which shock valves 66 are inserted.

As depicted in FIG. 4, axial piston motor 40 has motor pistons 42 which reciprocate in motor cylinder block 41 and have ends which bear against motor thrust bearing 43 to cause rotation of motor cylinder block 41. The opposite ends of motor pistons 42 (not shown) are open and communicate with motor kidney ports 23*d*. To allow each of the transaxles 20L and 20R to free wheel when vehicle 90 is not in operation, block lift bypass 44 of each of these transaxles is engaged by manipulation of bypass arm 44*a* which extends into main housing 23 through bypass opening 23*p*. Such manipulation causes bypass cam 44*b* to lift motor cylinder block 41 off motor running surface 23*b* such that hydraulic fluid flows freely into motor sump 49 when axle 22 and motor cylinder block 41 are rotated. Hydraulic fluid in motor sump 49 passes through motor drain 23*f* into sump connecting passage 23*g* and from there into charge pump inlet 82*a* or pump drain passage 23*e* and into pump sump 48.

It is to be understood that the above description of the invention should not be used to limit the invention, as other embodiments and uses of the various features of this invention will be obvious to one skilled in the art. This invention should be read as limited by the scope of its claims only.

I claim:

1. A hydraulic drive unit, comprising:
   a hydraulic pump connected to a hydraulic motor through a porting system;
   a valve in fluid communication with the porting system, the valve having a first position where the valve permits fluid communication between the hydraulic pump and the hydraulic motor and a second position where the valve prevents fluid communication between the hydraulic pump and the hydraulic motor to provide hydraulic braking to the hydraulic motor;
   an output axle driven by the hydraulic motor;
   a mechanical brake operably engaged to a portion of the output axle;
   a brake actuator disposed adjacent to the mechanical brake and movable between an engaged position where it actuates the mechanical brake and a disengaged position where the mechanical brake is not actuated;
   a mechanical brake engagement mechanism operably engaged to the brake actuator; and
   a brake arm operably engaged to both the valve and the mechanical brake engagement mechanism to move the valve between the first position and the second position and also cause the brake actuator to move between the engaged position and the disengaged position.

2. The hydraulic drive unit of claim 1, further comprising a housing in which the hydraulic pump and the hydraulic motor are disposed, and the porting system is integrally formed in the housing.

3. The hydraulic drive unit of claim 2, wherein the housing comprises a separate pump section and a separate motor section.

4. The hydraulic drive unit of claim 3, wherein the mechanical brake comprises a toothed hub and the brake actuator comprises a toothed engagement member.

5. The hydraulic drive unit of claim 4, wherein the toothed engagement member is disposed around an external surface of the motor section.

6. The hydraulic drive unit of claim 2, wherein the housing comprises a main housing in which the porting system is integrally formed, and a separate pump cover.

7. The hydraulic drive unit of claim 1, wherein the valve is a rotatable valve.

8. The hydraulic drive unit of claim 1, wherein the mechanical brake comprises a toothed hub and the brake actuator comprises a toothed engagement member.

9. The hydraulic drive unit of claim 2, wherein the mechanical brake engagement mechanism is disposed external to the housing.

10. The hydraulic drive unit of claim 9, wherein the mechanical brake engagement mechanism comprises a rod having a first end engaged to the brake arm and a second end engaged to the brake actuator.

11. A hydraulic drive unit, comprising:
    a hydraulic motor connected to a hydraulic pump through a porting system and an output shaft driven by the hydraulic motor;
    a mechanical brake for braking the hydraulic motor;
    a hydraulic brake comprising at least one valve for blocking flow between the hydraulic motor and the hydraulic pump; and
    a brake actuation assembly connected to both the mechanical brake and the hydraulic brake, whereby actuation of the brake actuation assembly causes both the mechanical brake and the hydraulic brake to be actuated.

12. A hydraulic drive unit of claim 11, further comprising:
    a main housing member comprising:
      a motor section having a motor running surface formed thereon;
      a pump section having a pump running surface formed thereon, wherein a first plane formed by the motor running surface is generally perpendicular to a second plane formed by the pump running surface; and
      hydraulic porting having a first passage connected to a first motor kidney port formed on the motor running surface and a first pump kidney port formed on the pump running surface and a second passage connected to a second motor kidney port formed on the motor running surface and a second pump kidney port formed on the pump running surface;
    a motor housing member engaged to the motor section to form a motor cavity, wherein the hydraulic motor is disposed in the motor cavity and comprises a motor cylinder block disposed on the motor running surface and the output shaft is engaged to and driven by the motor cylinder block; and
    a pump housing member engaged to the pump section to form a pump cavity, wherein the hydraulic pump is disposed in the pump cavity, the hydraulic pump comprising a pump cylinder block disposed on the pump running surface and an input shaft engaged to and driving the pump cylinder block.

13. The hydraulic drive unit of claim 12, wherein the at least one valve comprises a rotatable valve disposed in the main housing member and intersecting the first passage and the second passage, the rotatable valve being movable between a first position where the rotatable valve permits fluid communication between the hydraulic pump and the hydraulic motor and a second position where the rotatable valve prevents fluid communication between the hydraulic pump and the hydraulic motor to provide hydraulic braking to the hydraulic motor.

14. The hydraulic drive unit of claim 12, wherein the mechanical brake comprises a toothed hub and a toothed engagement member, wherein the toothed engagement member is disposed around an external surface of the motor housing member.

15. The hydraulic drive unit of claim 11, wherein the at least one valve is a rotatable valve.

16. The hydraulic drive unit of claim 11, wherein the mechanical brake comprises a toothed hub and a toothed engagement member.

17. The hydraulic drive unit of claim 14, wherein the brake actuation assembly further comprises a rod having a first end engaged to a brake arm and a second end engaged to the toothed engagement member.

18. A vehicle, comprising:
   a frame having a prime mover disposed thereon; and
   a pair of transaxles disposed on the frame and driven by the prime mover, each transaxle comprising:
      a hydraulic motor disposed in a housing and connected to a hydraulic pump through a porting system;
      an output shaft driven by the hydraulic motor;
      a mechanical brake for braking the hydraulic motor;
      a hydraulic brake comprising at least one valve for blocking flow between the hydraulic motor and the hydraulic pump; and
      a brake arm extending from the housing and connected to both the mechanical brake and the hydraulic brake, whereby actuation of the brake arm causes both the mechanical brake and the hydraulic brake to be actuated.

19. The vehicle of claim 18, wherein the at least one valve for each transaxle comprises a rotatable valve intersecting a first passage and a second passage between the hydraulic pump and the hydraulic motor, the rotatable valve being movable between a first position where the rotatable valve permits fluid communication between the hydraulic pump and the hydraulic motor and a second position where the rotatable valve prevents fluid communication between the hydraulic pump and the hydraulic motor to provide hydraulic braking to the hydraulic motor.

20. The vehicle of claim 19, wherein the mechanical brake for each transaxle comprises a toothed hub and a toothed engagement member, wherein the toothed engagement member is disposed around an external surface of the housing, and a rod having a first end engaged to the brake arm and a second end engaged to the toothed engagement member.

\* \* \* \* \*